United States Patent [19]

Wührer

[11] Patent Number: 5,653,577
[45] Date of Patent: Aug. 5, 1997

[54] TURBINE, IN PARTICULAR FRANCIS TURBINE

[75] Inventor: Wolfgang Wührer, Ravensburg, Germany

[73] Assignee: Suizer Hydro GmbH, Ravensburg, Germany

[21] Appl. No.: 561,611

[22] Filed: Nov. 21, 1995

[30] Foreign Application Priority Data

Dec. 2, 1994 [EP] European Pat. Off. ............. 94810683

[51] Int. Cl.$^6$ .......................... F04D 29/16; F04D 29/44; F04D 31/00
[52] U.S. Cl. ..................... 415/1; 415/110; 415/116; 415/168.2; 415/171.1; 415/173.1; 415/176; 415/211.2
[58] Field of Search .................... 415/1, 110, 112, 415/116, 144, 168.2, 171.1, 173.1, 173.5, 173.6, 175, 176, 208.2, 211.2; 261/84; 277/53, 67

[56] References Cited

FOREIGN PATENT DOCUMENTS

| 0633655 | 12/1961 | Canada ............... 415/110 |
| 1080683 | 12/1954 | France . |
| 2300909 | 9/1976 | France . |
| 324302 | 10/1957 | Switzerland . |
| 448749 | 4/1968 | Switzerland . |
| 850112 | 12/1960 | United Kingdom . |

OTHER PUBLICATIONS

Grein, H. (1981) "Schwingungserscheinungen in Francis-turbinen—Ursachen und Gegenmassnahmen", *Escher Wyss Mitteilungren*, 1:37–42.

*Primary Examiner*—Christopher Verdier
*Attorney, Agent, or Firm*—Townsend and Townsend and Crew LLP

[57] ABSTRACT

An arrangement provided for turbine wheels (4) with cover disks (6, 7) which have a contactless sealing region (8, 9) to the housing. An apron-shaped free jet is created within a mixer zone (15) by increasing the transmission cross-section to the housing side in connection to the sealing region (8, 9) in a stepwise manner in the mixer zone (15) adjoining in the same direction and by connection channels (16, 17, 18) from the outer air to the beginning of the mixer zone (15), the air (13) is sucked in and mixed in in order, after steering, to supply the water-air mixture at the rotor wheel outlet end (21) to the main flow (5). Air (13) is thus fed in behind the sealing region (8, 9) which, on the one hand, calms the flow in the main flow (5) behind the rotor wheel under partial load without auxiliary aggregates and, on the other hand, reduces the friction losses between the rotor wheel (4) and housing (1).

11 Claims, 3 Drawing Sheets

TURBINE, IN PARTICULAR FRANCIS TURBINE

BACKGROUND OF THE INVENTION

1. Technical Field

The invention relates to a turbine, in particular a Francis turbine comprising a housing, a guide apparatus and a closed rotor wheel having an outer cover disk and an inner cover disk for delimiting a main flow, each of which are formed in a respective sealing region as a contactless seal with a small radial play towards the housing in order to only permit small leakage currents in front of the rotor wheel inlet which do not flow through the rotor wheel for energy conversion.

2. Description of the Prior Art

Water turbines such as Francis turbines are, as a rule, coupled to a generator for power generation and are therefore operated with a rotational speed corresponding to the main frequency. Very high efficiencies are achieved at the design point during full load operation, whereas during partial load, a poorer flow through the rotor blades takes place. When the guide apparatus is adjusted for partial load, a co-rotating swirl arises at the rotor wheel outlet which produces a "pig-tail" in the center which can in some conditions produce noise and beats. This is often remedied by controlled, forced ventilation so that, on the one hand, a desired damping is provided and, on the other hand, underpressure is retained. The air introduced by this fills up a part of the cross-section behind the rotor wheel.

Today, there are systems with which the ventilation takes place essentially along the rotor wheel shaft by blowing air in through the inner cover disk into the center of an emitting flow ring—see P. Doerfler, Design Criteria for Air Admission System in Francis Turbines, IAHR Symposium, September 1986, Montreal, Canada. Other systems have a fixed middle tube in the emitting flow ring with a hollow tripod protruding into the flow and provided with openings in order to add compressed air to the flow—see H. Grein, Schwingungserscheinungen in Francisturbinen—Ursachen und Gegenmaßnahmen (Oscillation Effects in Francis Turbines—Causes and Countermeasures), Escher Wyss Mitteilungen 1/1981–1/1982. In all these cases compressors are necessary to produce larger compressed air flows. Moreover, installations such as tripods protruding into the flow represent flow resistances which also result in loss at the operational point with the best efficiency. Furthermore, in smaller turbines the cost of periphery equipment, such as compressors, is generally too high to be able to justify them.

SUMMARY OF THE INVENTION

The object of the invention is therefore to find a forced ventilation which is simpler and less costly. This object is satisfied in that the sealing region of at least one of either an outer or inner cover disk is formed as a jet pump for outer air, wherein the sealing gap extends into a mixer zone adjoining it in the same direction but provided with a larger radial play, wherein in the mixer zone on the one hand a free jet expansion of the leakage current takes place and, on the other hand, connection channels to the outer air exist in order to suck in air with a leakage current formed to an apron-shaped injection jet and mix the water-air mixture into the main flow at the rotor wheel outlet.

A jet apron passing through the periphery can be uniformly supplied with air by a radial recess on a housing side. The uniformity is improved when the recess is connected via a plurality of connection openings to the outer air.

The invention has the advantage that it is easy to realize and functions automatically without being dependent on other aggregates such as compressors.

Further advantageous embodiments are provided For example, a stepless transition at the cover disk from the sealing region into the mixer zone brings better mixing results than when a jump to the mixer zone takes place at the cover disk. Also, an optimum for the mixing in of the air in relation to the ratio of the radial plays is achieved when the radial play in the mixer zone is four to six times larger than in the sealing region. Additionally, a deviation zone adjoining the mixer zone and having an enlarging cross-section has the advantage that no back-pressure or damming arises and that fewer friction losses occur between the cover disk and the housing. Further, an inclined shoulder opposite the end face of the cover disk has proved to be a simple and effective solution which via ram blocks distributed over the periphery, removes the twist of the water-air mixture and thus prevents a pump action of the mixer ring. The inclined shoulder with a half cone angle $\alpha$ between 40 and 60 degrees has the advantage that the steering and mixing in of the water-air mixture takes place without negative additional effects.

This method of mixing in of the air is not limited to Francis turbines but is generally applicable to any turbine wheels having cover disks and sealing regions. The invention is described in the following by means of example only with the aid of the embodiments.

DESCRIPTION OF THE PREFERRED EMBODIMENTS

Figure 1:
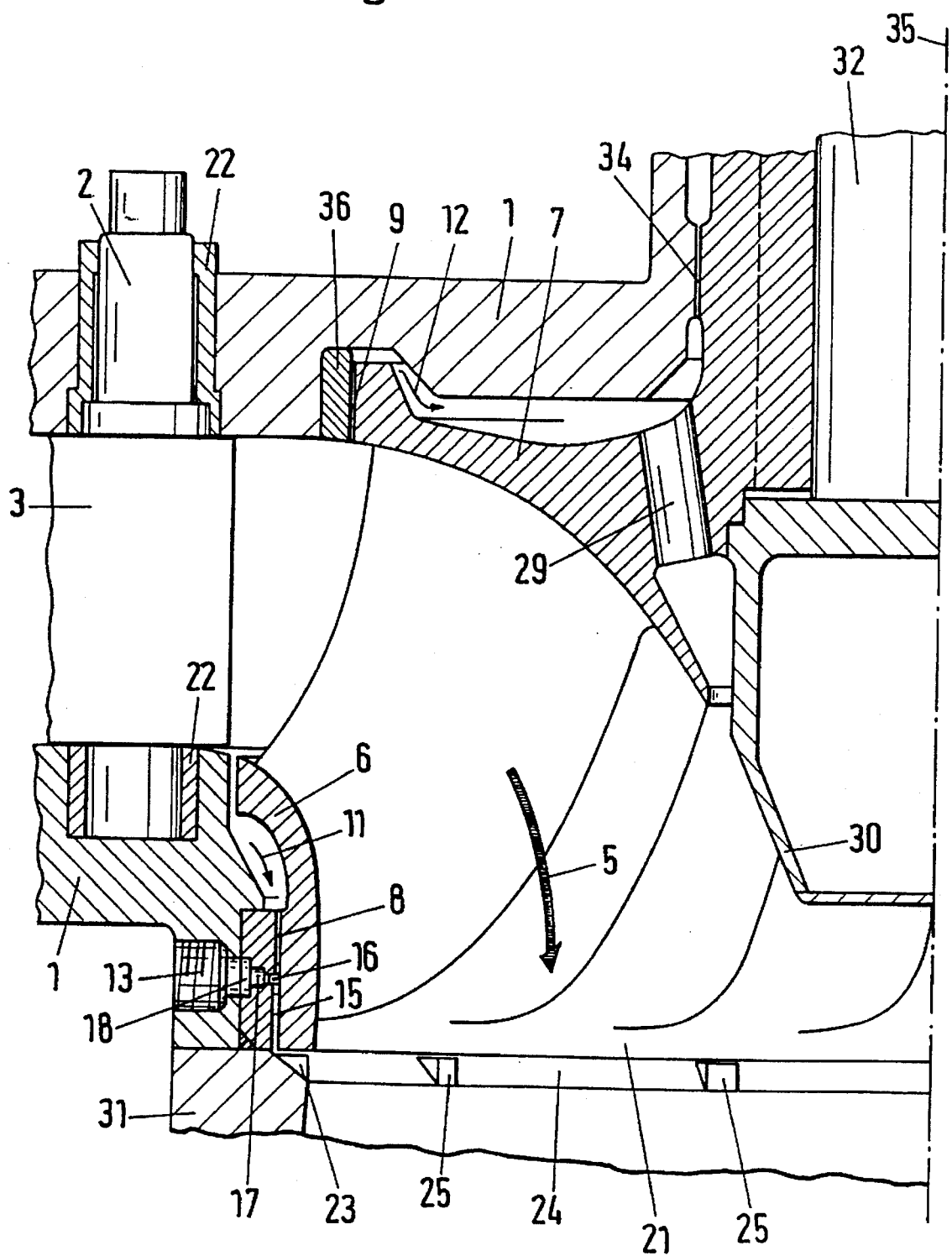
FIG. 1 is a schematic section of a Francis turbine with a rotor wheel whose outer cover shroud in the sealing region is modified to form a jet pump.

The Figures show turbine wheels having cover disks with a contactless sealing region to the housing.

An apron-shaped free jet is created within a mixer zone 15 by increasing the transmission cross-section to the housing side in connection to a sealing region 8, 9 in a stepwise manner in the mixer zone 15 adjoining in the same direction and by connection channels 16, 17, 18 from the outer air to the beginning of the mixer zone 15. Air 13 is sucked in and mixed in in order, after steering, to supply a water-air mixture at a rotor wheel outlet end 21 to a main flow 5. Air 13 is thus fed in behind the sealing region 8, 9 which, on the one hand, calms the flow in the main flow 5 behind the rotor wheel under partial load without auxiliary aggregates and, on the other hand, reduces the friction losses between rotor wheel 4 and housing 1.

In FIG. 1 the main flow 5 is guided through a turbine with separated turbine housing 1. A guide apparatus or diffuser changes the angle of attack and the amount of main flow flowing into the rotor wheel 4 at constant rotational speed by means of guide blades 3 journalled in guide shells 22. The rotor wheel 4 is secured on a shaft 32 with a non-rotatable toothed arrangement and held by a hub cover 30 realized as a hollow shaft side-fin in order to additionally guide the main flow 5 as it exits from the rotor wheel. The rotor wheel 4 possesses an inner cover disk 7 and an outer cover disk 6. The inner cover disk 7 seals at its periphery in a contactless manner in a sealing region 9 against a wear ring 36 fitted in the housing 1, with a leakage current or flow 12 occurring which substantially fills out the space between the cover disk 7 and the housing 1 and is supplied once more to the main flow 5 at the hub cover 30 to the rotor wheel outlet 21 via connection openings 29. In a preferred embodiment, there are at least four such connection openings. The main flow 5 produces on its outlet 21 from the rotor wheel an under-pressure at the inner cover disk between the inner cover disk 7 and the hub cover 30. The under-pressure in relation to atmospheric can be so large at the inlet of the connection opening 29 that air is sucked out by a labyrinth seal 34 between the housing 1 and the rotor wheel hub. By inclined positioning of the bores 29 in the direction of rotation, an additional suction action can be achieved.

Behind the outer cover disk 6 a leakage current 11 flows (see FIGS. 1 and 2) which initially traverses an entrance gap 28 having many times a radial play 10 of the sealing region 8. The actual restriction and acceleration takes place at the inlet and transverse of the sealing region which is characterized by a low radial play 10, for example, of 0.4 mm for a diameter of 430 mm between a cylindrical region of the cover disk 6 and an insertion 26 let into the housing 1. In an adjoining mixer zone 15, the cylindrical surface of the cover disk 6 is continued without interruption with a radial play 14 corresponding to many times the radial play 10 of the sealing region 8, for example 2 mm. A ring channel 16 pierces through at an insertion 26 at the transition between the sealing region 8 and the mixer zone 15, this ring channel being connected to a ring-shaped distributor 18 via more, for example eight, connection openings 17 distributed over the periphery, with the distributor 18 in turn being connected via a suction line 19 to the surrounding air 13. The insertion 26 is secured by a suction tube 31 screwed onto the housing 1 with a soft seal 27 pressed in between the suction tube 31 and the housing 1. In the suction tube 31, the cross-section for the main flow gradually increases in order to achieve re-pressurization with as little loss as possible. The leakage current 11 emitting from the sealing region 8 forms an apron-shaped injection jet similar to a jet pump which opens out according to the free jet expansion and to the rotation caused by the drag action of the rotor wheel and enters into the mixer zone 15 with the addition of air. A water-air mixture which has not been braked thus comes out of the mixer zone 15 in a deviation zone 23 and meets an inclined shoulder 24 which steers the mixture radially towards the main flow 5. The half cone angle α of the inclined shoulder 24 towards the rotor wheel axis 35 measures in excess of 40 degrees in order to achieve a short return path without back-pressure. Ram or accumulation blocks 25 are mounted on the inclined shoulder 24 distributed uniformly at the periphery for the production of sufficiently large entry components into the main flow 5. In a preferred embodiment, there are at least six such ram blocks. These ram blocks substantially prevent a co-rotation of the mixture 20 in the periphery direction within the deviation zone 23. The air introduced thus reduces the drag power of the cover disk 6, both in the mixer zone 15 and in the deviation zone 23.

Figure 3:
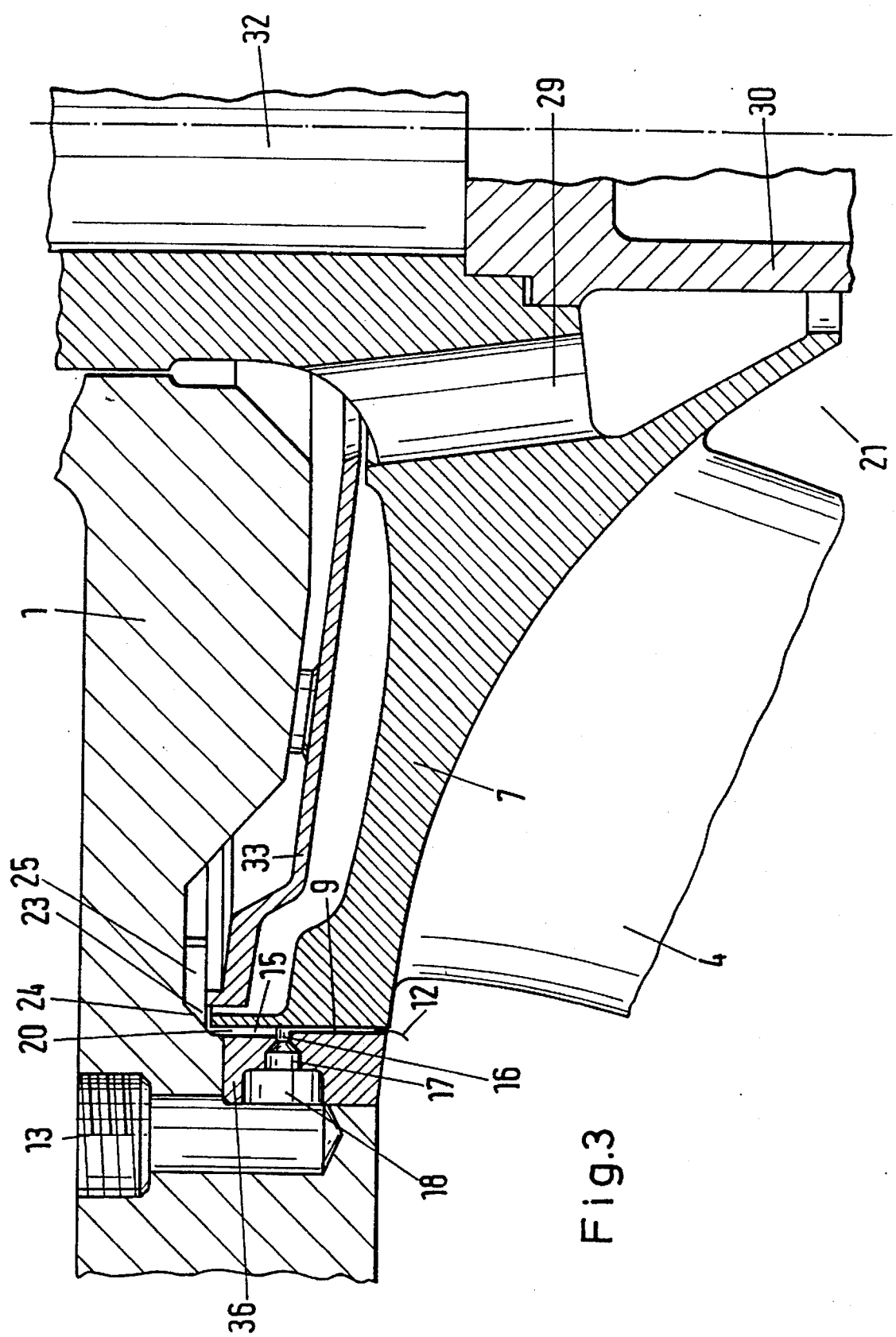
FIG. 3 is a schematic section of an inner cover shroud with a sealing region modified to form a jet pump for air.

In FIG. 3 the sucking in of air for an inner cover disk 7 is shown in which a water-air mixture 20 is radially steered to a collector sheet 33 so that it flows to connection openings 29 in the rotor wheel hub and is admixed to the main flow in the region of the hub cover 30. The periphery of the inner cover disk 7 comprises a continuous cylindrical surface, whereas the wear ring 36 lying opposite is worked from the inside so that initially a sealing region 9 with a small radial play of, for example, 0.4 mm is produced to which adjoins a ring channel 16 and further a mixer zone 15 with a substantially larger radial play of, for example, 2 mm. The ring channel 16 is connected to the outer air 13 via a plurality of connection openings 17 and a distributor ring 18, with it being advantageous in stationary cases to take the air from above the water level. The leakage current 12 leaves the sealing region 9 as an apron-shaped free jet which mixes in air in the mixer region 15 and has a water-air mixture impacting onto an inclined shoulder 24 in the housing 1. An expanding deviation zone 23 is bordered by the inclined shoulder 24, the end face edge of the inner cover disk 7, and the edge of the collection sheet 33. On the edge of the collection sheet 33, ram blocks 25 are mounted distributed over the periphery which improve the steering of the water-air mixture into the radial play. With this apron-shaped injector there is therefore in general the possibility of introducing outer air 13 against a pressure which is the same as the outer pressure or higher and, in the special case of the inner cover disk 7, the possibility of bringing this outer air and the leakage current 12 past the back-side of the cover disk to the connection openings 29 in a controlled manner. Any water spray between the collection sheet 33 and the cover disk 7 will be centrifuged out by the rotation of the cover disk and mixed in in the deviation zone 23.

Figure 2:
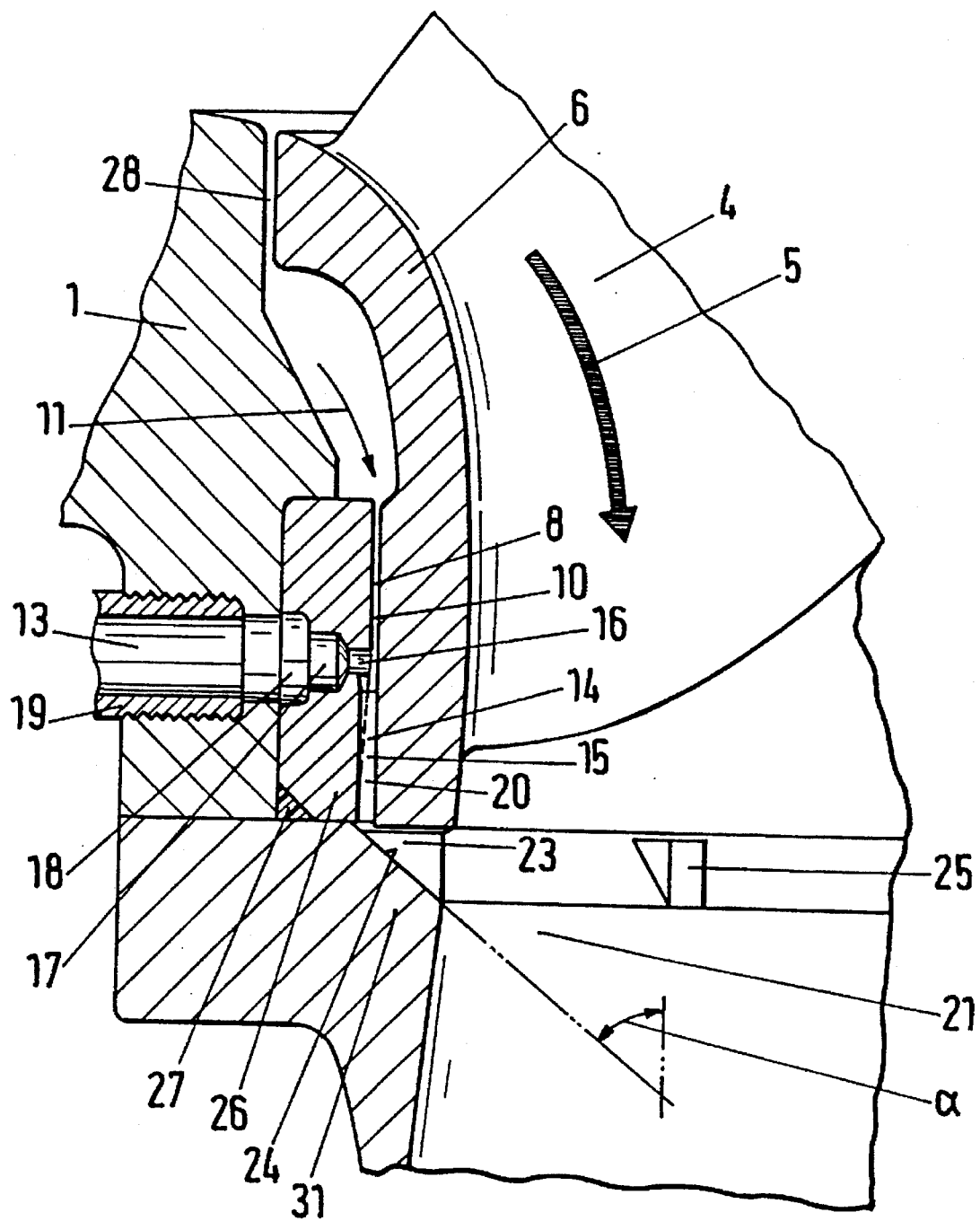
FIG. 2 is a schematic of an enlarged section of FIG. 1 in the region of the outer cover shroud.

As can be seen in FIGS. 1 and 2, a surface of covered disk 6 defines an inner contour of sealing region 8, as well as an inner contour of mixer zone 15 such that when viewed in longitudinal section, the defined inner contours of sealing region 8 and mixer zone 15 lie on a straight line. Likewise, as can be seen in FIG. 3, a surface of covered disk 7 defines an inner contour of sealing region 9, as well as an inner contour of mixer zone 15 such that when viewed in longitudinal section, the defined inner contours of sealing region 9 and mixer zone 15 lie on a straight line.

An equilibrium state for the proportion of water adjusts itself in the radial direction between the cover disk and the collection sheet.

Therefore, a method of use is disclosed for a turbine, such as a Francis turbine, in accordance with the present invention and having a rotor wheel 4 with cover disks 6, 7 for adding outer air 13 to a main flow 5 at the rotor wheel outlet 21. A leakage current 11, 12, which branches off prior to the rotor wheel inlet, is guided along the cover disk through a contactless sealing region 8, 9 with small radial play to form an apron-shaped propulsion jet with free jet expansion into a mixer zone with larger radial play 14 adjoining the sealing region. The outer air is distributed by a plurality of connecting openings into a ring-shaped standing-back distribution channel, which is located at the transition to the mixer zone for uniformly distributing the air to the circumference of the apron-shaped jet. The air is sucked into the mixer zone in order to steer a water-air mixture 20 created thereby into an expanding cross-section adjoining the mixer zone 15 and add it to the main flow at the rotor wheel outlet 21.

In an alternative embodiment, the turbine has an adjustable guide apparatus 2 and the sucked-in air may pass a restriction position, which reduces its resistance with increasing closure of the guide apparatus. Thus, compared to full load, a larger amount of air is mixed into the main flow at the rotor wheel outlet when the turbine is running at partial load.

What is claimed is:

1. A method for a turbine comprising a rotor wheel with a cover disk, a rotor wheel inlet, a rotor wheel outlet, and a contactless sealing region with a radial play, the method comprising:

adding air to a leakage current that branches off prior to the rotor wheel inlet and is guided along the cover disk through the contactless sealing region;

utilizing the leakage current as an apron-shaped propulsion jet with free jet expansion into a mixer zone with a larger radial play adjoining the sealing region and thereby sucking in and conveying the air when passing a ring-shaped, radially standing-back distribution channel at its circumference in order to steer a water-air mixture created thereby into an expanding cross-section adjoining the mixer zone; and adding the water-air mixture to a main flow at the rotor wheel outlet.

2. A method in accordance with claim 1 wherein the turbine further comprises an adjustable guide apparatus, and wherein the method further comprises:

adjusting a resistance of the adjustable guide apparatus by adjusting an amount of closure of the adjustable guide apparatus; and passing the air that is sucked-in through the adjustable guide apparatus in order to adjust the amount of air that is added into the main flow at the rotor wheel outlet.

3. A turbine comprising a housing, a guide apparatus and a closed rotor wheel having an outer cover disk and an inner cover disk for delimiting a main flow, each of which being formed in a respective sealing region as a contactless seal with a small radial play towards the housing in order to only permit small leakage currents in front of the rotor wheel inlet which do not flow through the rotor wheel for energy conversion, whereby the sealing region of at least one of the cover disks is formed as a jet pump for outer air, wherein the small radial play extends into a mixer zone adjoining it in the same direction but provided with a larger radial play, wherein in the mixer zone firstly a free jet expansion of the leakage currents takes place and, secondly, the outer air is sucked in via connection channels by the leakage currents formed to an apron-shaped injection jet and mixing a water-air mixture into the main flow at the rotor wheel outlet, whereby the sealing region has a ring-shaped, radial recess on the housing side at the transition to the mixer zone into which a plurality of connection openings open out in order to supply the air to the apron-shaped injection jet uniformly distributed over the circumference of the jet.

4. A turbine in accordance with claim 3, wherein the number of connection openings opening out into the ring-shaped recess is four or more.

5. A turbine in accordance with claim 3, wherein the radial play of the mixer zone corresponds to four to six times the radial play of the sealing region.

6. A turbine in accordance with claim 3, wherein a deviation zone adjoins the mixer zone and has an expanding cross-section in the through-flow direction for the water-air mixture in order to steer the mixture to the main flow without back pressure or reflux.

7. A turbine in accordance with claim 6, wherein the deviation zone is bordered on the housing side by an inclined shoulder and on the rotor wheel side by a radially extending end face of the cover disk.

8. A turbine in accordance with claim 7, wherein the inclined shoulder corresponds, relative to the rotor wheel axis, to a cone-shaped cut-out with a half cone angle $\alpha$ larger than 40 degrees.

9. A turbine in accordance with claim 6, wherein a plurality of ram or accumulation blocks are mounted in a separation at the periphery in the deviation zone and wherein said blocks, according to separation between the blocks, limit the rotation of the water-air mixture co-rotating with the rotor wheel in the direction of rotation and steer this mixture radially towards the rotor wheel axis.

10. A turbine in accordance with claim 9, wherein the number of ram or accumulation blocks amounts to six or more.

11. A turbine in accordance with claim 3 wherein at least one of the covered disks has a surface that defines an inner contour of the respective sealing region and further defines an inner contour of the mixer zone such that the defined inner contour of the sealing region and the defined inner contour of the mixer zone lie on a straight line.

* * * * *